(12) United States Patent
Zhou

(10) Patent No.: US 10,939,184 B2
(45) Date of Patent: Mar. 2, 2021

(54) IMAGE CAPTURE OF MULTIMEDIA CONTENT

(71) Applicant: ARRIS Enterprises LLC, Suwanee, GA (US)

(72) Inventor: Wei Zhou, Sammanish, WA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/524,977

(22) Filed: Jul. 29, 2019

(65) Prior Publication Data

US 2019/0349649 A1 Nov. 14, 2019

Related U.S. Application Data

(63) Continuation of application No. 14/579,121, filed on Dec. 22, 2014, now abandoned.

(51) Int. Cl.
*H04N 21/81* (2011.01)
*H04N 21/472* (2011.01)
*H04N 21/433* (2011.01)
*H04N 21/434* (2011.01)
*H04N 21/462* (2011.01)

(52) U.S. Cl.
CPC ..... *H04N 21/8153* (2013.01); *H04N 21/4334* (2013.01); *H04N 21/4345* (2013.01); *H04N 21/462* (2013.01); *H04N 21/47205* (2013.01); *H04N 21/47217* (2013.01)

(58) Field of Classification Search
CPC ............. H04N 21/8153; H04N 21/231; H04N 21/239; H04N 21/4312; H04N 21/433; H04N 21/438; H04N 21/44; H04N 21/462; H04N 21/858; H04N 21/278; H04N 21/431; H04N 21/4318; H04N 21/4333; H04N 21/4334; H04N 21/472; H04N 21/47205; H04N 21/47217; H04N 21/482; H04N 21/8146; H04N 21/8173; H04N 21/84; H04N 21/4345; H04N 5/44543; H04N 2005/44556

See application file for complete search history.

(56) References Cited

U.S. PATENT DOCUMENTS

| 8,547,482 | B2 | 10/2013 | Jing et al. | |
|---|---|---|---|---|
| 9,008,491 | B2 | 4/2015 | Kulas | |
| 2004/0190854 | A1* | 9/2004 | Dunn | H04N 21/4333 386/230 |
| 2005/0102260 | A1 | 5/2005 | Spring et al. | |
| 2005/0149978 | A1* | 7/2005 | Narita | H04N 21/44023 725/105 |
| 2006/0198437 | A1 | 9/2006 | Kim | |
| 2006/0218410 | A1* | 9/2006 | Robert | H04N 5/772 713/189 |

(Continued)

*Primary Examiner* — Alexander Gee
(74) *Attorney, Agent, or Firm* — Buchanan Ingersoll & Rooney PC

(57) ABSTRACT

Methods, systems, and computer readable media can be operable to facilitate the capture and storage of an image of displayed content. A device may be configured to copy and/or store an image of received content as the content is displayed to a user. A user may initiate an image capture through a device interface while viewing content on the device. The device may provide the user with various options for interacting with, outputting, and/or storing the copied image.

17 Claims, 4 Drawing Sheets

(56) References Cited

U.S. PATENT DOCUMENTS

| | | |
|---|---|---|
| 2007/0180488 A1 | 8/2007 | Walter et al. |
| 2007/0300261 A1 | 12/2007 | Barton et al. |
| 2008/0212938 A1 | 9/2008 | Sato et al. |
| 2008/0285940 A1 | 11/2008 | Kulas |
| 2009/0138906 A1 | 5/2009 | Eide et al. |
| 2009/0288128 A1 | 11/2009 | Dida et al. |
| 2010/0191809 A1 | 7/2010 | Espinosa et al. |
| 2010/0192065 A1 | 7/2010 | Se |
| 2012/0110621 A1 | 5/2012 | Gossweiler, III |
| 2012/0293687 A1 | 11/2012 | Kam et al. |
| 2013/0031222 A1 | 1/2013 | Molander |
| 2013/0329109 A1* | 12/2013 | Park .............. H04N 21/42209 348/333.02 |
| 2014/0146231 A1 | 5/2014 | Lin et al. |
| 2014/0177964 A1 | 6/2014 | Godlewski et al. |
| 2015/0058893 A1 | 2/2015 | Hong et al. |
| 2015/0110472 A1 | 4/2015 | Matsuyama |

\* cited by examiner

IMAGE CAPTURE OF MULTIMEDIA CONTENT

RELATED APPLICATIONS

This application is a continuation of U.S. application Ser. No. 14/579,121 titled "Image Capture of Multimedia Content," which was filed on Dec. 22, 2014, the entirety of which is hereby incorporated by reference.

TECHNICAL FIELD

This disclosure relates to capturing an image associated with multimedia content.

BACKGROUND

Various devices are available to content subscribers for viewing and interacting with multimedia content. Retail device and devices controlled by multiple system operators (MSOs) may be used by a content subscriber to receive data, video and/or voice services offered by a service provider. Content may be received by a subscriber through various avenues and in various forms. For example, a subscriber may be able to view live television, recorded content, video-on-demand (VoD) content, and other types of multimedia on a single device. A device may be operable to allow a content subscriber to apply various trickplay functions (e.g., fast-forward, rewind, pause, etc.) to received content. As content subscribers are given more options for interacting with received multimedia content, a subscriber may benefit from the ability to record or otherwise capture a moment experienced while viewing content. Therefore, a need exists for improving methods and systems for interacting with and recording received multimedia content.

BRIEF DESCRIPTION OF THE DRAWINGS

Like reference numbers and designations in the various drawings indicate like elements.

DETAILED DESCRIPTION

It is desirable to improve upon methods and systems for interacting with and recording received multimedia content. Methods, systems, and computer readable media are described herein for facilitating the capture and storage of an image of displayed content. A device may be configured to copy and/or store an image of received content as the content is displayed to a user. A user may initiate an image capture through a device interface while viewing content on the device and the device may provide the user with various options for interacting with, outputting, and/or storing the copied image. For example, a copied image may be stored within internal storage at the image capturing device or may be output to external storage (e.g., external server, electronic mailbox, etc.).

Figure 1:
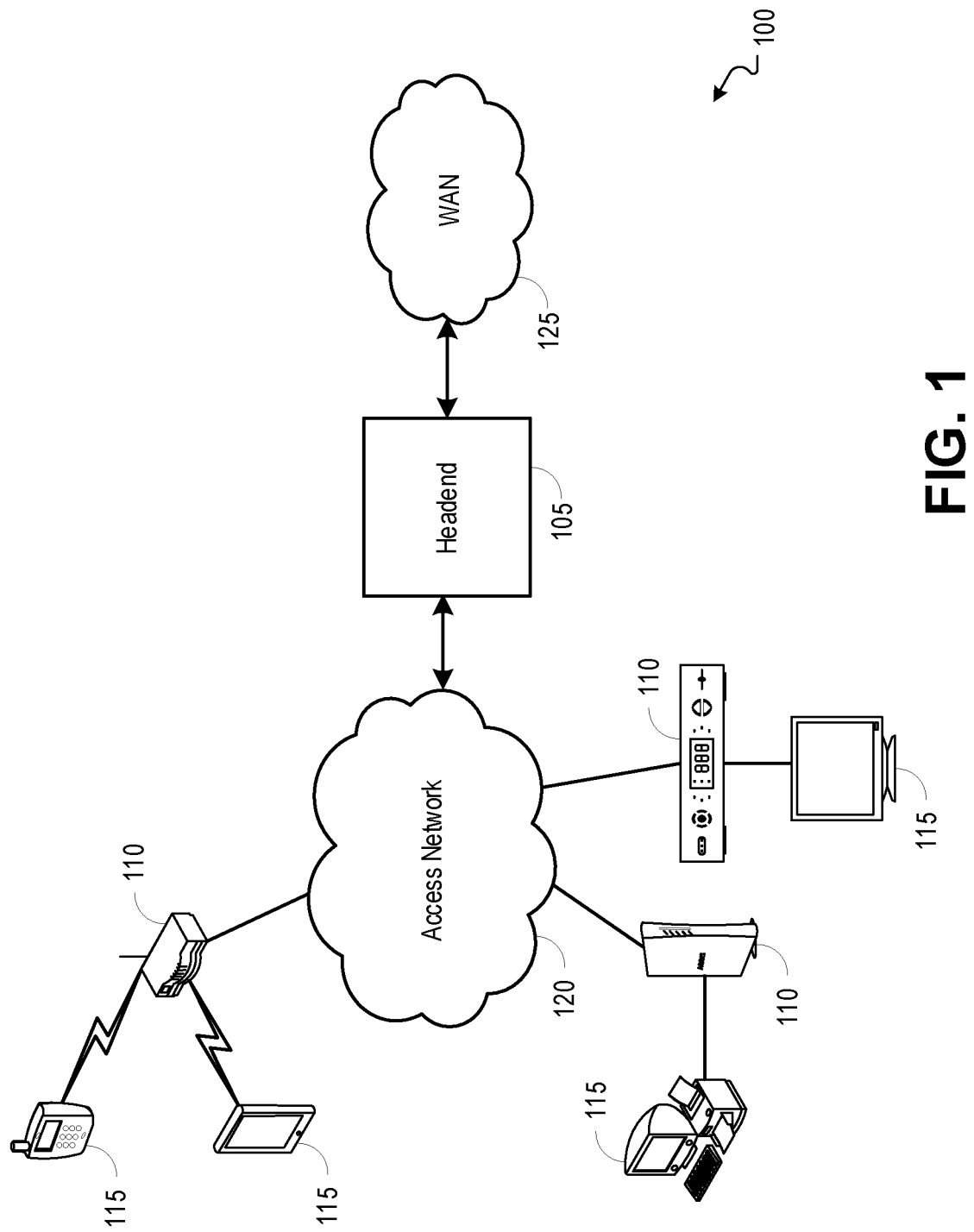
FIG. 1 is a block diagram illustrating an example network environment operable to facilitate the capture and storage of an image associated with multimedia content.

FIG. 1 is a block diagram illustrating an example network environment 100 operable to facilitate the capture and storage of an image associated with multimedia content. In some implementations, a headend 105 can provide video, data and/or voice service(s) to customer premise equipment (CPE) devices 110 in one or more subscriber groups (e.g., service group(s)). The CPE devices can include, for example, a set-top box (STB), a cable modem, a wireless router including an embedded cable modem, among many others (e.g., digital subscriber line (DSL) modem, video game console, digital versatile disc (DVD) player, communications device, hotspot device, etc.). CPE devices 110 can interact with and deliver services to various client devices 115 such as televisions, computers, tablets, mobile devices, and any other device capable of receiving video, data and/or voice services.

The CPE devices 110 can communicate with the headend 105 via an access network 120. The access network 120 may include, for example, a hybrid fiber-coaxial (HFC) network, twisted pair network, local telephone network, wireless networks including 4G and long term evolution (LTE), and any other network operable to deliver video, data and/or voice services to CPE devices 110 and/or client devices 115. In embodiments, the headend 105 can facilitate the delivery of communications between the access network 120 and a wide-area network (WAN) 125. For example, video, data and/or voice services can be delivered to CPE devices 110 from the WAN 125. It should be understood that client devices 115 may be configured to receive video, data and/or voice services directly from an access network 120.

In embodiments, a subscriber can view multimedia content on a client device 115. For example, a subscriber, through a client device 115, can view and interact with live television, recorded video content (e.g., content stored at a digital video recorder (DVR)), Internet protocol television (IPTV) content, video-on-demand (VoD) content, and any other video content. It should be understood that video content can be viewed at various resolutions according to the client device 115 and/or CPE device 110 that is used to view the content. In embodiments, a CPE device 110 or client device 115 may allow a subscriber to apply various trickplay functions (e.g., fast-forward, rewind, pause, etc.) to video content.

In embodiments, a CPE device 110 or client device 115 may be configured to capture and/or store an image of video content as the content is displayed to a user through a client device 115. The CPE device 110 or client device 115 may receive a user request to capture an image that is displayed, and in response to the request, the device can pause playback of the associated video content, create a copy of the image displayed through the device, and output or otherwise store the copied image according to user instructions. For example, the copied image may be stored internally within storage at the image capturing device or may be output to external storage (e.g., external server such as a cloud server, electronic mailbox, etc.).

In embodiments, program information associated with the video content (e.g., cast, program title, channel, summary, genre, date, time, etc.) may be retrieved and stored along with the captured image. For example, the captured image may be stored and/or organized according to the associated program information. The program information may be retrieved from electronic program guide (EPG) data that is received at the CPE device 110 or client device 115.

Figure 2:
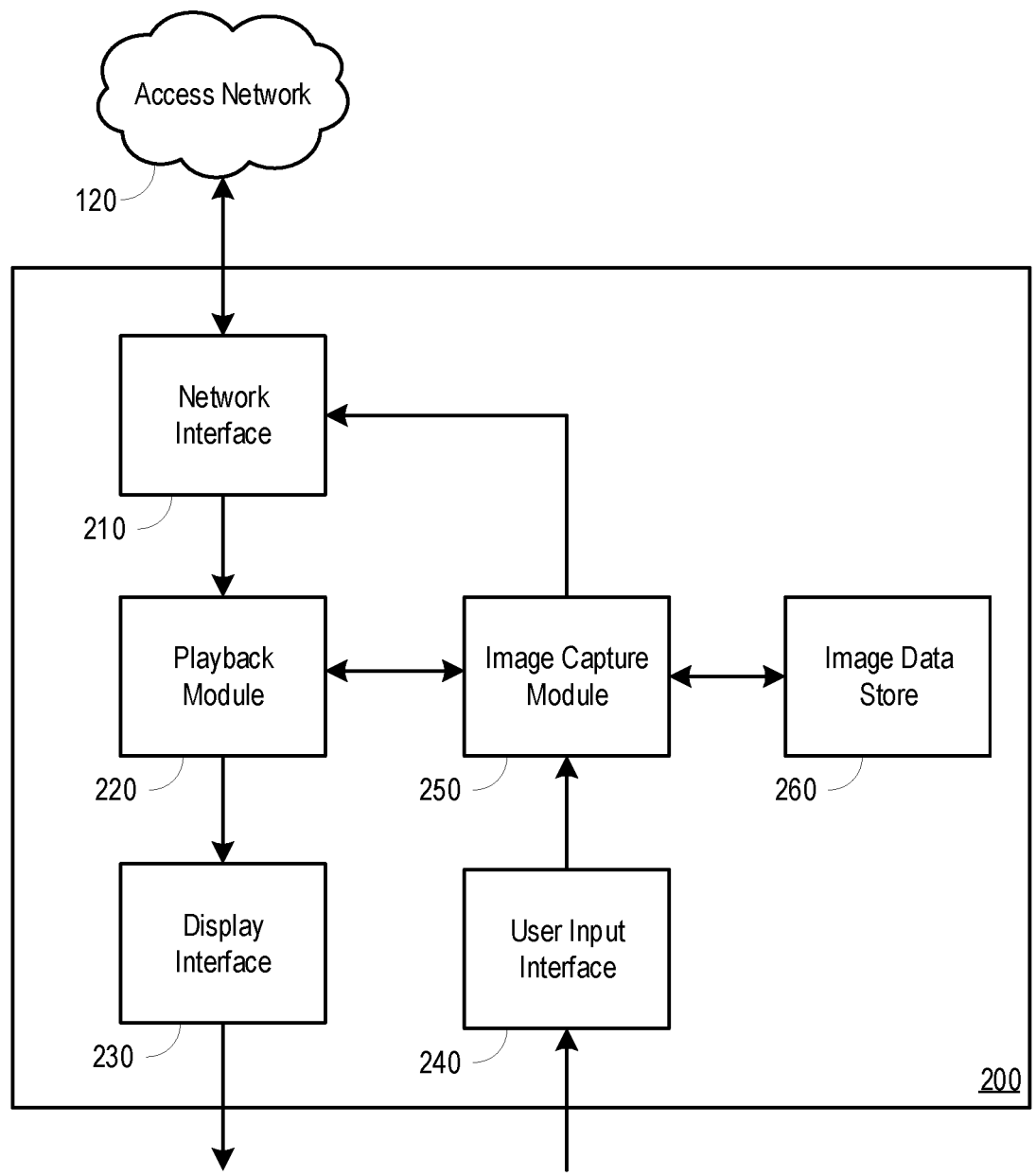
FIG. 2 is a block diagram illustrating an example device operable to facilitate the capture and storage of an image associated with multimedia content.

FIG. 2 is a block diagram illustrating an example component 200 operable to facilitate the capture and storage of an image associated with multimedia content. The component 200 may include a network interface 210, a playback module 220, a display interface 230, a user input interface 240, an image capture module 250 and an image data store 260. In embodiments, the component 200 may be within a CPE device 110 and/or client device 115 of FIG. 1.

The component 200 may receive video content from an access network 120, through the network interface 210. The video content may include live television, recorded video content, IPTV content, VoD content, and any other multimedia content. In embodiments, a playback module 220 can control playback of the received multimedia content. A playback module 220 may carry out trickplay functions (e.g., pause, play, rewind, fast-forward, etc.) on the received multimedia content based upon input received from a user. As multimedia content is received by the playback module 220, the content can be output to a display through the display interface 230. It should be understood that the display interface 230 may output the video content at one of various formats and resolutions.

In embodiments, the component 200 may receive a user request to capture an image associated with the multimedia content being output through the display interface. A user may be provided with an interface for requesting capture of an image associated with multimedia content being output through the display interface 230. For example, a user may be provided with an option for signaling the capture of an image through a GUI output on a display screen or display device associated with the component 200. As another example, a user may request capture of an image by pressing a button on a remote control device, the button being designated for signaling the capture of an image.

In embodiments, when a request to capture an image is received at the image capture module 250, the image capture module 250 may instruct the playback module 220 to pause playback of the video content being output through the display interface 230. The image capture module 250 can capture an image of the paused multimedia content. For example, the image capture module 250 can identify the frame (e.g., Moving Picture Experts Group (MPEG) frame) at which the video content is paused, and can copy and/or save the identified frame as an image. The image may be captured by taking a screen capture of the picture displayed through the display interface 230.

In embodiments, content received by a CPE device 110 or client device 115 may be stored at a disk buffer within the receiving device, thereby allowing playback of the content to be paused and/or previously played segments of the content to be retrieved when a rewind function is initiated by a user. When a user initiates an image capture request, the frame that is being displayed to the user may be copied from the disk buffer and stored in memory associated with the receiving CPE device 110 or client device 115. It will be appreciated by those skilled in the relevant art that the copied frame may be converted into various formats for storage (e.g., Joint Photographic Experts Group (JPEG)).

The image capture module 250 may output through the display interface 230, a dialog or interface comprising one or more options for storing the identified frame. For example, the dialog or interface may include options such as storing the frame at storage local to the component 200 (e.g., image data store 260), outputting the frame to an electronic mail address, outputting the frame to a remote server or other storage, canceling the image capture and resuming playback of the multimedia content, as well as many other options for acting on the identified frame.

In embodiments, the image capture module 250 may receive user input directing storage of the identified frame. If the user requests that the identified frame be saved and stored locally at a CPE device 110 or client device 115 associated with the component 200, the image capture module 250 can forward a copy of the identified frame to the image data store 260. If the user requests that the identified frame be saved and stored at a remote server or storage, the image capture module can output a copy of the identified frame to an upstream server or storage through the network interface 210.

In embodiments, an electronic mail address can be designated to receive a copy of the identified frame. For example, an electronic mail address can be associated with a CPE device 110 or client device 115, and when so instructed by user input, the image capture module 250 can package a copy of the identified frame and output the copy of the identified frame to the designated electronic mail address through the network interface 210. A designated electronic mail address can be established as a setting of an associated CPE device 110 or client device 115, or a user can be prompted to input an electronic mail address when choosing the option to output the captured image as electronic mail.

In embodiments, the captured image may be stored within a directory organizing captured images by one or more program properties (e.g., channel, title of program, genre of program, cast, time of capture, date of capture, etc.). For example, when an image capture request is received at the image capture module 250, the image capture module 250 can retrieve information identifying one or more program properties of the associated multimedia content. For example, programming information associated with the video content may be received by the component 200 as EPG data. The captured image can then be organized in a directory according to the identified properties. The directory can be stored, for example, at the image data store 260 or at a remote server or storage.

In embodiments, the image capture module 250 may receive a user request to display one or more captured images. For example, a user may be provided with an option for signaling the retrieval of an image using a GUI and/or remote control device. A user may be provided with options for navigating through a directory comprising a plurality of saved images. For example, a user may search for and display images based upon program properties of the video content associated with each image. A user may be provided with options for viewing and/or interacting with one or more images, including but not limited to displaying an individual image, displaying a group of images, displaying a plurality of images as a slideshow, deleting one or more images, and others. The image capture module 250 may respond to a user request for searching for or displaying images by retrieving images and/or information associated with images from the image data store 260 or remote servers or storage. The image capture module 250 can output images and/or information associated with images to a display through the display interface 230.

In embodiments, an MSO can enable or disable the ability of a CPE device 110 or client device 115 to capture images. An image capture function may be enabled or disabled at a device based upon a service level subscribed to by a user. For example, an MSO can enable (e.g., through an update to a configuration file for a device) the image capture function if a user subscribers to a service offering the image capture function. In embodiments, the image capture function may be enabled or disabled at a device based upon the programming received at the device. For example, the image capture function may be disabled for certain types of video content or programming as determined by an MSO or content provider.

Figure 3:
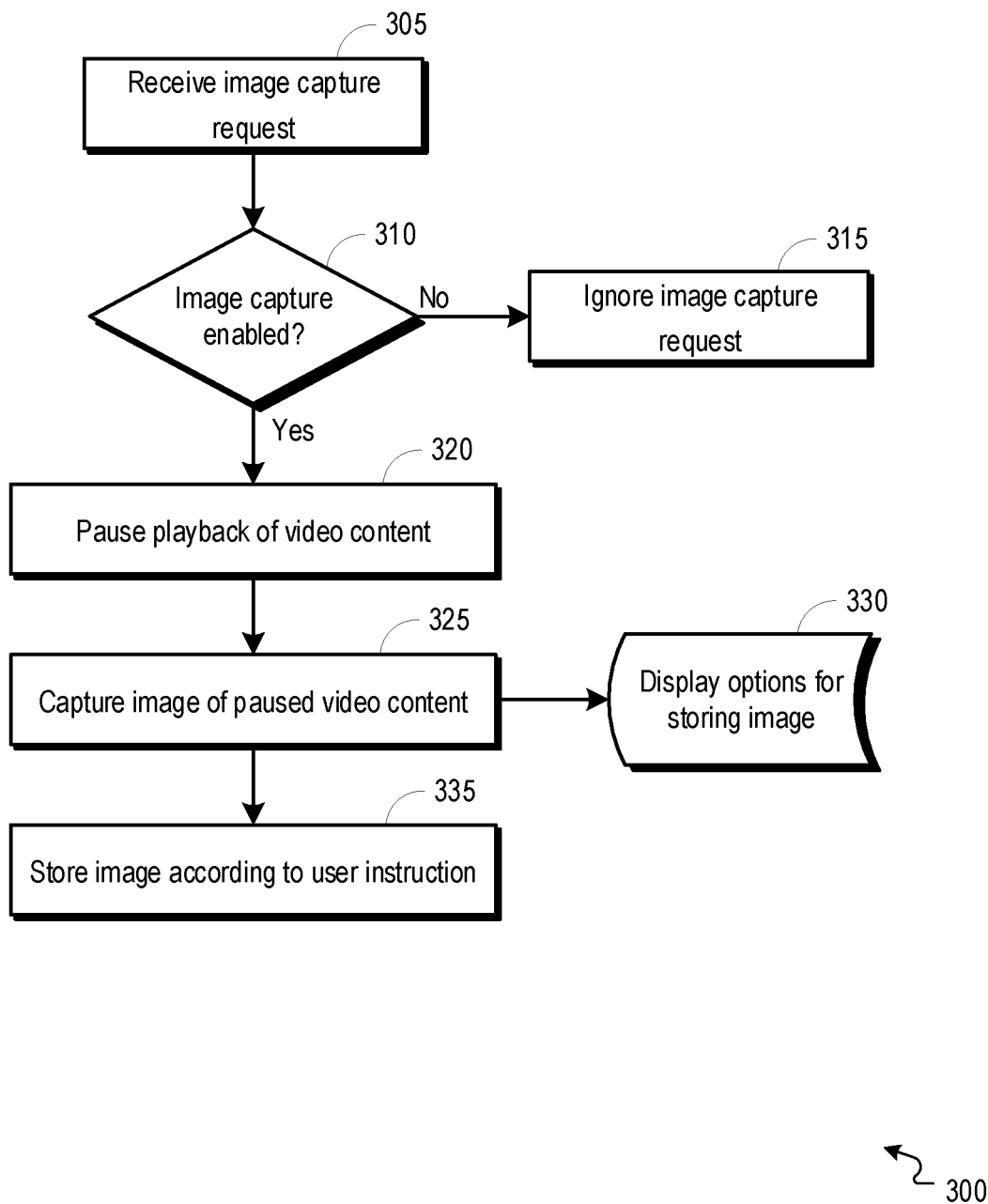
FIG. 3 is a flowchart illustrating an example process operable to facilitate the capture and storage of an image associated with multimedia content.

FIG. 3 is a flowchart illustrating an example process 300 operable to facilitate the capture and storage of an image associated with multimedia content. The process 300 can begin at 305, when an image capture request is received from a user. For example, an image capture request can be received from a user while the user is viewing multimedia content. It should be understood that the image capture request may be received at various types of devices (e.g., STB 110, client devices 115, etc.) and may be received while the user is viewing various types of video content (e.g., live content, stored content, VoD Content, etc.). For example, a user may be provided with an option for signaling the capture of an image through a GUI output on a display screen or display device associated with the component 200 of FIG. 2. As another example, a user may request capture of an image by pressing a button on a remote control device, the button being designated for signaling the capture of an image.

At 310, a determination can be made whether image capture is a function that is enabled at the client or subscriber device. In embodiments, the image capture function may be enabled/disabled according to a setting at the device. For example, an MSO may disable the image capture function unless the user subscribes to a service including the image capture function. In embodiments, the image capture function may be enabled/disabled according to the programming being viewed. For example, a content provider may preclude a user from using an image capture function with certain programming. A message disabling the image capture function can be delivered along with programming. If the determination is made that the image capture function is not enabled, the image capture request may be ignored at 315.

If at 310 the determination is made that the image capture function is enabled, the process 300 can proceed to 320. At 320, playback of the associated multimedia content may be paused. In embodiments, when a request to capture an image is received at the image capture module 250 of FIG. 2, the image capture module 250 may instruct the playback module 220 of FIG. 2 to pause playback of the multimedia content being output through the display interface 230 of FIG. 2. The paused multimedia content may be displayed such that a user can view the image that is to be captured. In embodiments, the user may use trickplay functions (e.g., rewind, fast-forward, pause, etc.) to locate and display a frame of the video content that the user wishes to capture.

At 325, the displayed image of the paused multimedia content may be captured. In embodiments, the image capture module 250 of FIG. 2 can capture an image of the paused multimedia content. For example, the image capture module 250 can identify the frame (e.g., Moving Picture Experts Group (MPEG) frame) at which the video content is paused, and can copy and/or save the identified frame as an image. As another example, the image of the paused content as it is displayed to the user may be captured. The displayed image may be copied and/or saved using various image file formats (e.g., JPEG).

At 330, options for storing the captured image may be output to a user. In embodiments, the image capture module 250 of FIG. 2 may output through the display interface 230 of FIG. 2, a dialog or interface comprising one or more options for storing the captured image. For example, the dialog or interface may include options such as storing the image at storage local to the device receiving the video content (e.g., STB 110, client device 115, etc.), outputting the image to an electronic mail address, outputting the image to a remote server or other storage, canceling the image capture and resuming playback of the video content, as well as many other options for acting on the captured image.

At 335, the captured image may be stored according to an instruction received from a user. In embodiments, the device receiving the multimedia content may receive user input directing storage of the captured image. For example, the user input may be received from a user interface (e.g., remote control device, GUI, etc.). The captured image may be stored in various formats and at various devices and/or locations. If the user requests that the identified frame be saved and stored locally at a CPE device 110 or client device 115 receiving the video content, the image capture module 250 of FIG. 2 can forward a copy of the captured image to the image data store 260 of FIG. 2. If the user requests that the captured image be saved and stored at a remote server or storage, the image capture module can output a copy of the captured image to an upstream server or storage. An electronic mail address can be designated to receive a copy of the captured image, and when so instructed by user input, the image capture module 250 can package a copy of the captured image and output the copy of the capture image to the designated electronic mail address. The stored image may include program properties (e.g., summary, channel, genre, cast, title, etc.).

In embodiments, the captured image may be stored within a directory organizing captured images by one or more program properties (e.g., summary, channel, genre, cast, title, etc.). For example, when an image capture request is received at the image capture module 250 of FIG. 2, the image capture module 250 can retrieve information identifying one or more properties of the associated video content. The properties may be identified from EPG data received at an associated CPE device 110 of FIG. 1 or client device 115 of FIG. 1. The captured image can then be organized in a directory according to the identified properties. The directory can be stored, for example, at the image data store 260 of FIG. 2 or at a remote server or storage.

Figure 4:
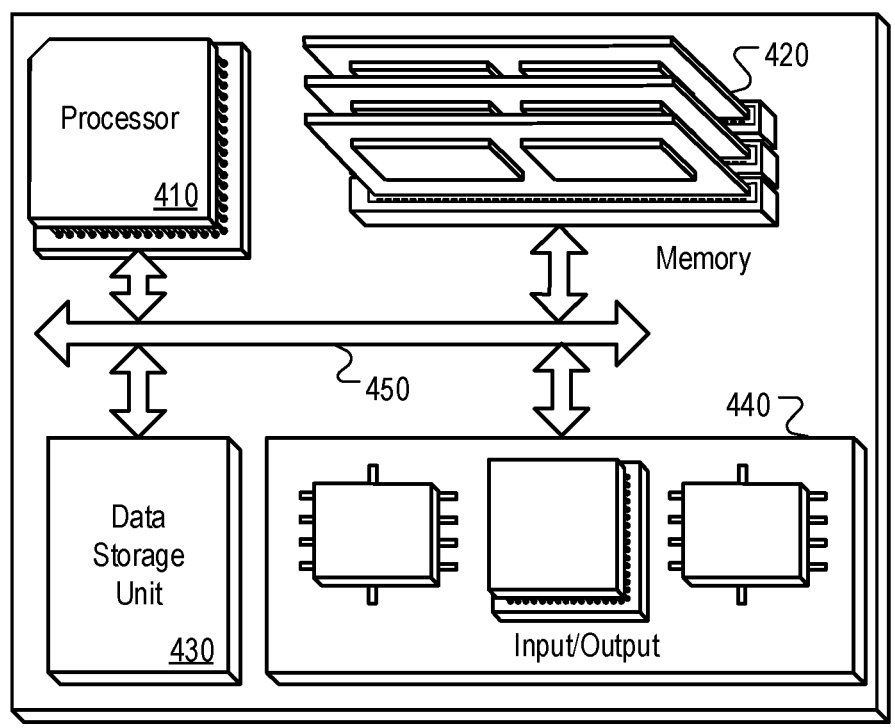
FIG. 4 is a block diagram of a hardware configuration operable to facilitate the capture and storage of an image associated with multimedia content.

FIG. 4 is a block diagram of a hardware configuration 400 operable to facilitate the capture and storage of an image associated with multimedia content. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a nonvolatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device 110 of FIG. 1 (e.g., STB, gateway, etc.) and/or a client device 115 of FIG. 1 (e.g., television, computer, tablet, mobile device, etc.). In embodiments, the input/output device can include driver devices configured to send communications to, and receive communications from one or more networks (e.g., access network 120 of FIG. 1, WAN 125 of FIG. 1, etc.).

Those skilled in the art will appreciate that the invention improves upon methods and systems for interacting with multimedia content. The methods, systems, and apparatuses described in this disclosure enable the capture and storage of an image of content that is displayed at a client device. A CPE device and/or client device may be configured to copy and/or store an image of content as the content is displayed to a user. The CPE device or client device may provide a user with various options for interacting with, outputting, and/or storing the copied image.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    receiving multimedia content at a set-top box, wherein the received multimedia content is displayed through a display interface;
    receiving a user request to capture an image associated with the multimedia content, the user request to capture the image being received at the set-top box, wherein the image comprises the picture of the multimedia content as the content is displayed through the display interface;

determining whether capture of an image associated with the multimedia content is a function that is enabled at the set-top box based upon one or more settings at the set-top box, wherein the one or more settings designate certain types of video content for which capture of an image associated with the multimedia content is a disabled function, and wherein the certain types of video content comprises one or more of live content, stored content, or video-on-demand content; and in response to a determination that capture of an image associated with the multimedia content is a function that is enabled at the set-top box:
  creating a copy of the image associated with the multimedia content by:
    pausing playback of the received multimedia content;
    copying a frame associated with the paused content, the frame being located at the point in the content at which the content is paused; and
    converting the copied frame into an image file; and
  storing the copy of the image associated with the multimedia content.

2. The method of claim 1, further comprising:
outputting a user interface comprising one or more options for storing the copy of the image, the user interface being output through the display interface;
receiving user input associated with storing the copy of the image; and wherein the copy of the image is stored according to the user input.

3. The method of claim 2, wherein the copy of the image is stored at the set-top box.

4. The method of claim 2, wherein the copy of the image is output to and stored at a server that is external to the set-top box.

5. The method of claim 1, further comprising:
retrieving program information associated with the received multimedia content; and
wherein the copy of the image is stored according to the program information.

6. The method of claim 5, wherein the program information is retrieved from electronic program guide data associated with the received multimedia content.

7. An apparatus comprising:
a network interface configured to be used to receive multimedia content;
a display interface configured to be used to display the multimedia content;
a user input interface configured to be used to receive a user request to capture an image associated with the multimedia content, wherein the image comprises the picture of the multimedia content as the content is displayed;
a module configured to:
  determine whether capture of an image associated with the multimedia content is a function that is enabled based upon one or more settings, wherein the one or more settings designate certain types of video content for which capture of an image associated with the multimedia content is a disabled function, and wherein the certain types of video content comprises one or more of live content, stored content, or video-on-demand content; and
  in response to a determination that capture of an image associated with the multimedia content is a function that is enabled:
    create a copy of the image associated with the multimedia content by:
      pausing playback of the received multimedia content;
      copying a frame associated with the paused content, the frame being located at the point in the content at which the content is paused; and
      converting the copied frame into an image file; and
an image output interface configured to output the copy of the image for storage.

8. The apparatus of claim 7, wherein:
the display interface is further configured to be used to output a user interface comprising one or more options for storing the copy of the image;
the user input interface is further configured to be used to receive user input associated with storing the copy of the image; and
wherein the copy of the image is output for storage according to the user input.

9. The apparatus of claim 7 further comprising:
storage configured to store the copy of the image.

10. The apparatus of claim 7, further comprising:
a module configured to retrieve program information associated with the received multimedia content; and
wherein the copy of the image is output for storage according to the program information.

11. The apparatus of claim 10, wherein the program information is retrieved from electronic program guide data associated with the received multimedia content.

12. One or more non-transitory computer readable media having instructions operable to cause one or more processors to perform the operations comprising:
receiving multimedia content at a device, wherein the received multimedia content is displayed through a display interface;
receiving a user request to capture an image associated with the multimedia content, wherein the image comprises the picture of the multimedia content as the content is displayed through the display interface;
determining whether capture of an image associated with the multimedia content is a function that is enabled based upon one or more settings, wherein the one or more settings designate certain types of video content for which capture of an image associated with the multimedia content is a disabled function, and wherein the certain types of video content comprises one or more of live content, stored content, or video-on-demand content;
in response to a determination that capture of an ism' e associated with the multimedia content is a function that is enabled:
creating a copy of the image associated with the multimedia content; and
storing the copy of the image associated with the multimedia content.

13. The one or more non-transitory computer-readable media of claim 12, wherein the device is a set-top box and the user request to capture the image is received at the set-top box, wherein the instructions are further operable to cause one or more processors to perform the operations comprising:
creating the copy of the image by:
pausing playback of the received multimedia content;

copying a frame associated with the paused content, the frame being located at the point in the content at which the content is paused; and converting the copied frame into an image file.

14. The one or more non-transitory computer-readable media of claim 13, wherein the copy of the image is stored at the set-top box.

15. The one or more non-transitory computer-readable media of claim 13, wherein the copy of the image is output to and stored at a server that is external to the set-top box.

16. The one or more non-transitory computer-readable media of claim 12, wherein the instructions are further operable to cause one or more processors to perform the operations comprising:

retrieving program information associated with the received multimedia content; and wherein the copy of the image is stored according to the program information.

17. The one or more non-transitory computer-readable media of claim 16, wherein the program information is retrieved from electronic program guide data associated with the received multimedia content.

\* \* \* \* \*